United States Patent
Virdie et al.

(10) Patent No.: US 10,745,067 B2
(45) Date of Patent: Aug. 18, 2020

(54) MOTOR VEHICLE APPARATUS AND METHOD

(71) Applicant: Jaguar Land Rover Limited, Whitley, Coventry, Warwickshire (GB)

(72) Inventors: Jag Virdie, Coventry (GB); Ian Bossons, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/781,992

(22) PCT Filed: Dec. 7, 2016

(86) PCT No.: PCT/EP2016/080008
§ 371 (c)(1),
(2) Date: Jun. 6, 2018

(87) PCT Pub. No.: WO2017/097800
PCT Pub. Date: Jun. 15, 2017

(65) Prior Publication Data
US 2018/0354566 A1 Dec. 13, 2018

(30) Foreign Application Priority Data
Dec. 9, 2015 (GB) .................................. 1521697.1

(51) Int. Cl.
*B62D 35/00* (2006.01)
*B62D 37/02* (2006.01)
*B60T 1/16* (2006.01)

(52) U.S. Cl.
CPC ........... *B62D 35/007* (2013.01); *B62D 37/02* (2013.01); *B60T 1/16* (2013.01); *Y02T 10/82* (2013.01)

(58) Field of Classification Search
CPC .............................. B62D 35/007; B62D 37/02
(Continued)

(56) References Cited

U.S. PATENT DOCUMENTS

| 4,660,879 A | 4/1987 | Kobayashi et al. |
| 6,193,302 B1 * | 2/2001 | Won .................... B62D 35/007 296/180.1 |

(Continued)

FOREIGN PATENT DOCUMENTS

| DE | 3520971 A1 | 9/1986 |
| DE | 103 47 449 A1 | 5/2005 |

(Continued)

OTHER PUBLICATIONS

Patents Act 1977: Combined Search and Examination Report under Sections 17 and 18(3), UKIPO Application No. GB1521696.3, dated May 24, 2016, 8 pp.

(Continued)

*Primary Examiner* — Jason S Morrow
(74) *Attorney, Agent, or Firm* — Reising Ethington, P.C.

(57) ABSTRACT

An active wing apparatus (100) configured to be attached to a boot lid of a motor vehicle, the apparatus (100) comprising a wing assembly (120) configured to reversibly deploy in a first direction from a stowed condition to a deployed condition, the apparatus (100) further comprising anchor means (113L,113R) configured releasably to couple the apparatus (100) to a structural member being a portion of the vehicle body (50B) other than the boot lid, when the apparatus transitions from the stowed to the deployed condition.

11 Claims, 9 Drawing Sheets

(58) Field of Classification Search
USPC .......................................... 296/180.1, 180.5
See application file for complete search history.

(56) References Cited

U.S. PATENT DOCUMENTS

| | | | |
|---|---|---|---|
| 7,213,870 B1* | 5/2007 | Williams | B62D 35/007 296/180.5 |
| 10,207,752 B2* | 2/2019 | Causley | B62D 35/007 |
| 10,220,892 B1* | 3/2019 | Fahland | B62D 35/007 |
| 2002/0067049 A1 | 6/2002 | Pettey | |
| 2002/0093220 A1 | 7/2002 | Borghi et al. | |
| 2007/0001482 A1 | 1/2007 | Larson | |
| 2007/0228772 A1 | 10/2007 | Froeschle et al. | |
| 2007/0236045 A1 | 10/2007 | Froeschle et al. | |
| 2007/0236046 A1* | 10/2007 | Froeschle | B62D 35/007 296/180.5 |
| 2008/0179915 A1 | 7/2008 | Wegener et al. | |
| 2009/0102227 A1* | 4/2009 | Herndon | B62D 35/001 296/100.06 |
| 2010/0090497 A1 | 4/2010 | Beckon | |
| 2014/0021742 A1 | 1/2014 | Durm et al. | |
| 2014/0346810 A1 | 11/2014 | Wild et al. | |
| 2015/0084372 A1 | 3/2015 | Green et al. | |
| 2015/0274223 A1 | 10/2015 | Wolf et al. | |
| 2018/0001944 A1* | 1/2018 | Causley | B62D 35/007 |
| 2018/0093718 A1* | 4/2018 | Charpentier | B62D 35/007 |
| 2019/0061843 A1* | 2/2019 | Fahland | B62D 35/007 |

FOREIGN PATENT DOCUMENTS

| | | |
|---|---|---|
| DE | 10 2004 030 571 A1 | 1/2006 |
| DE | 10 2011 088 852 A1 | 6/2013 |
| DE | 10 2012 111 849 A1 | 6/2014 |
| DE | 10 2013 105 223 A1 | 11/2014 |
| EP | 1 118 529 A2 | 7/2001 |
| EP | 1 738 996 A2 | 1/2007 |
| EP | 1 840 014 A1 | 10/2007 |
| EP | 1 840 017 A1 | 10/2007 |
| EP | 2 080 694 A2 | 7/2009 |
| GB | 2 347 903 A | 9/2000 |
| GB | 2459979 A | 11/2009 |
| JP | 2005-212719 A | 8/2005 |
| JP | 2008-168843 A | 7/2008 |
| KR | 10-2005-0023647 A | 3/2005 |
| WO | WO 2008/041757 A1 | 4/2008 |
| WO | WO 2012/161607 A1 | 11/2012 |
| WO | WO 2015/143267 A1 | 9/2015 |

OTHER PUBLICATIONS

International Search Report and Written Opinion of the International Searching Authority, International Application No. PCT/EP2016/080009, dated Feb. 10, 2017, 11 pp.
Patents Act 1977: Combined Search and Examination Report under Sections 17 and 18(3), UKIPO Application No. GB1521697.1, dated May 24, 2016, 6 pp.
International Search Report and Written Opinion of the International Searching Authority, International Application No. PCT/EP2016/080008, dated Mar. 24, 2017, 17 pp.
Patents Act 1977: Combined Search and Examination Report under Sections 17 and 18(3), UKIPO Application No. GB1521699.7, dated May 24, 2016, 9 pp.
International Search Report and Written Opinion of the International Searching Authority, International Application No. PCT/EP2016/080011, dated Feb. 10, 2017, 12 pp.

* cited by examiner

MOTOR VEHICLE APPARATUS AND METHOD

RELATED APPLICATIONS

This application is a 35 U.S.C. § 371 national stage application of PCT Application No. PCT/EP2016/080008, filed on Dec. 7, 2016, which claims priority from Great Britain Patent Application No. 1521697.1, filed on Dec. 9, 2015, the contents of which are incorporated herein by reference in their entireties. The above-referenced PCT International Application was published in the English language as International Publication No. WO 2017/097800 A1 on Jun. 15, 2017.

TECHNICAL FIELD

The present disclosure relates to a motor vehicle active wing apparatus.

BACKGROUND

It is known to provide a motor vehicle having a rear mounted wing for generating a down force when the vehicle is travelling at speed. The down force increases the force between wheels of the vehicle and the driving surface, enhancing traction. In some vehicles the wing is fixed whilst in some known vehicles the wing is retractable. In the case of retractable wings, packaging of the wing in the retracted condition can be a problem due to extreme packaging constraints, particularly in vehicles intended to provide high performance at speed.

It is against this background that the present invention has been conceived. Embodiments of the invention may provide an apparatus, vehicle, controller, method, carrier medium, computer program product, computer readable medium or processor which addresses the above problems. Other aims and advantages of embodiments of the invention will become apparent from the following description, claims and drawings.

SUMMARY OF THE INVENTION

In an aspect of the invention for which protection is sought there is provided motor vehicle active wing apparatus configured to be switchable between a retracted condition and a deployed condition under the control of a deployment actuator, wherein in the deployed condition the wing assembly is raised relative to the retracted condition to increase an amount of aerodynamic force generated by forward movement of the vehicle, the apparatus further comprising anchor means configured releasably to couple the apparatus to a structural member of the vehicle when the apparatus transitions from the retracted to the deployed conditions.

In a further aspect of the invention for which protection is sought there is provided an active wing apparatus for a motor vehicle, the apparatus comprising a wing assembly configured to reversibly deploy in a first direction from a stowed condition to a deployed condition, the apparatus further comprising anchor means configured releasably to couple the apparatus to a structural member of the vehicle when the apparatus transitions from the stowed to the deployed conditions.

Embodiments of the present invention have the advantage that the apparatus may be attached to a portion of a vehicle, such as a boot (or trunk) lid of the vehicle, that is not designed to be load bearing. When the apparatus transitions from the retracted to the deployed conditions, the anchor means may releasably couple the apparatus to a structural member such as a portion of a body of the vehicle other than the boot lid, in order to transmit forces generated by the wing assembly directly to the structural member rather than via the boot lid. This reduces the amount of stress loading on the boot lid, which may in turn reduce the stress loading on components that coupled the boot lid to the remainder of the vehicle structure, such as one or more hinges and/or one or more locks.

Optionally, the apparatus may be configured to reversibly expand telescopically along a second direction transverse to the first direction from a compact condition to an expanded condition when the apparatus deploys in the first direction.

Optionally, the apparatus is configured to be attached to a boot lid of a vehicle and the anchor means is configured to lock the apparatus to a structural member of the vehicle being a portion of the vehicle body other than the boot lid when the apparatus deploys from the stowed condition to the deployed condition, wherein forces imposed on the apparatus are coupled at least in part substantially directly to the portion of the vehicle body to which the apparatus is locked by the anchor means.

Thus, forces imposed on the apparatus are coupled at least in part substantially directly to the vehicle body and not via the boot lid. Some amount of force may be communicated via the boot lid in some arrangements.

The apparatus may comprise lifting means for lifting the wing assembly when the apparatus transitions from the stowed to the deployed condition, wherein the lifting means is configured to cause the anchor means releasably to couple the apparatus to the structural member.

Optionally, the lifting means comprises at least one lifting arm configured to cause lifting of the wing assembly to the deployed condition from the stowed condition.

Optionally, the at least one lifting arm is configured to rotate from a first position to a second position when the wing assembly is lifted from the stowed condition to the deployed condition, the apparatus being arranged wherein rotation of the at least one lifting arm towards the deployed condition causes the anchor means to couple the apparatus to the structural member of the vehicle.

Optionally, the anchor means comprises at least one shooting bolt configured to assume a deployed position when the apparatus is in the deployed condition and a stowed position when the apparatus in the stowed condition, wherein with the apparatus in the deployed condition the shooting bolt locks the apparatus to the structural member of the vehicle and with the apparatus in the stowed condition the apparatus is released from the structural member.

In some embodiments, as the lifting means causes lifting of the wing assembly the at least one shooting bolt moves towards the deployed position to lock the apparatus to the structural member. At least a portion of the at least one shooting bolt may be arranged to pass through an aperture formed in the structural member so as to lock the apparatus to the structural member. The at least one shooting bolt may be arranged to move axially in a substantially horizontal plane when it moves from the deployed position to lock the apparatus to the structural member.

Optionally, each said at least one lifting arm is pivotably coupled at a first end to a base portion of the apparatus and at a second end to the wing assembly.

The base portion of the apparatus may be arranged to be fixedly coupled to a portion of the vehicle such as a boot lid of the vehicle.

Optionally, each said at least one shooting bolt is coupled to at least one said at least one lifting arm, wherein movement of the at least one lifting arm as the apparatus transitions from the stowed to the deployed conditions causes the at least one shooting bolt to move to the deployed condition.

Optionally, each said at least one shooting bolt is coupled to at least one said at least one lifting arm by means of a bar linkage to form a slider crank mechanism, wherein rotation of the at least one lifting arm causes movement of the bar linkage which in turn causes axial translation of the at least one shooting bolt from the stowed condition to the deployed condition.

Optionally, the lifting means comprises at least two lifting arms arranged to pivot about their first ends in substantially opposite directions when the apparatus transitions from the stowed to the deployed conditions, each lifting arm being coupled to a respective shooting bolt.

In a further aspect of the invention for which protection is sought there is provided a vehicle comprising apparatus according to a preceding aspect.

Optionally, the apparatus is coupled to a boot lid of the motor vehicle and the anchor means is configured releasably to couple the apparatus to a structural member of the vehicle, wherein the structural member is forms part of a body of the vehicle other than the boot lid.

Optionally, the structural member is a portion of the body of the vehicle that defines at least in part an aperture that is opened and closed by the boot lid, and with respect to which the boot lid moves when the boot lid is opened or closed.

It is to be understood that the structural member may comprise a portion of the body of the vehicle to which the boot lid is attached.

In an aspect of the invention for which protection is sought there is provided a method of deploying an active wing apparatus comprising causing a wing assembly to reversibly deploy in a first direction from a stowed condition to a deployed condition, and causing anchor means of the apparatus releasably to couple the apparatus to a structural member of the vehicle when the apparatus transitions from the stowed to the deployed conditions.

Optionally, the apparatus is attached to a boot lid of the vehicle, and releasably coupling the apparatus to a structural member of the vehicle comprises releasably coupling the apparatus to a body of the vehicle to which the boot lid is attached.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which.

DETAILED DESCRIPTION

Figure 1:
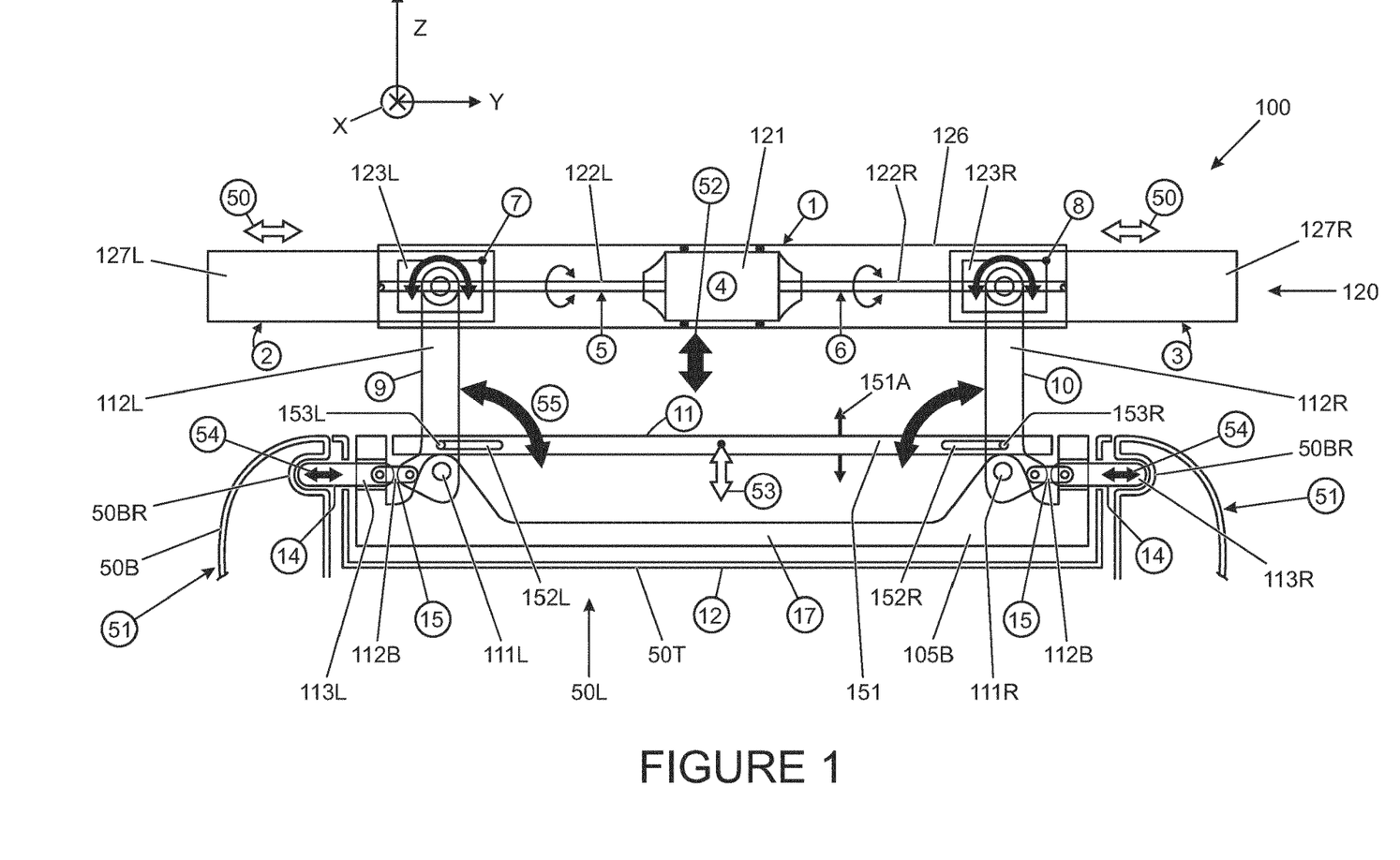
FIG. 1 is a sectional rear view of a rear wing apparatus according to an embodiment of the present invention in a deployed condition as viewed in a forward direction along a longitudinal axis of a motor vehicle body to which the apparatus is mounted.
Figure 2:
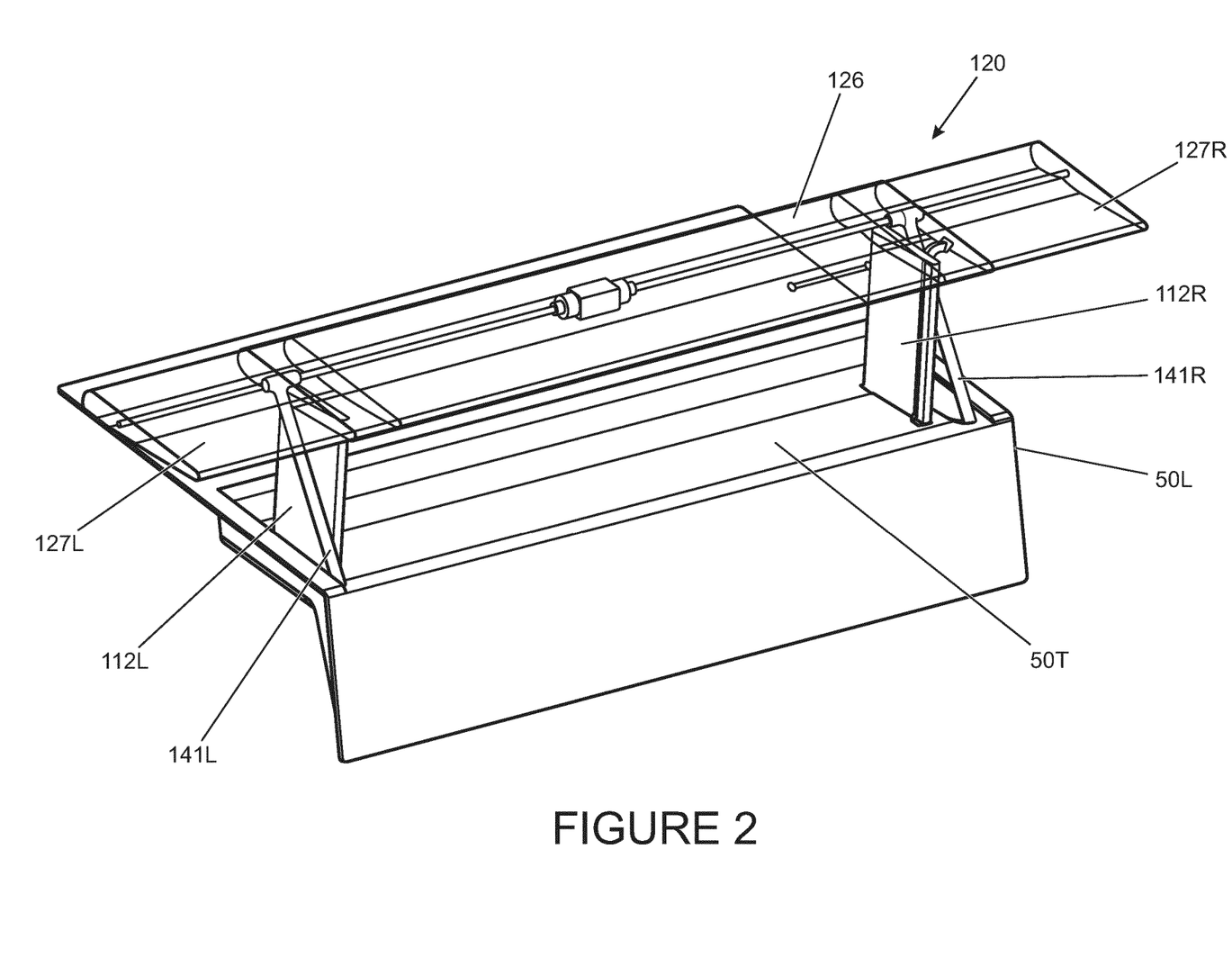
FIG. 2 is a rear perspective view of the rear wing apparatus of FIG. 1 in the deployed condition and mounted to a tray provided in a rear boot lid of a vehicle.

FIG. 1 is a section view of a rear wing apparatus 100 according to an embodiment of the present invention. An x-axis of the Cartesian coordinate system illustrated is directed into the plane of the page as indicated by the feathered arrow indicated at x. FIG. 2 is a rear perspective view of the apparatus 100 mounted to a tray 50T provided in the lid 50L of a rear boot (or trunk) of a motor vehicle having a body 50B a portion of which is shown in FIG. 1.

The apparatus 100 has a base portion 105B that is configured to be fixed to a base of the tray 50T of the boot lid 50L. The base portion 105B carries a pair of lever arms 112L, 112R that support an expandable wing assembly 120 of the apparatus 100.

Figure 3:
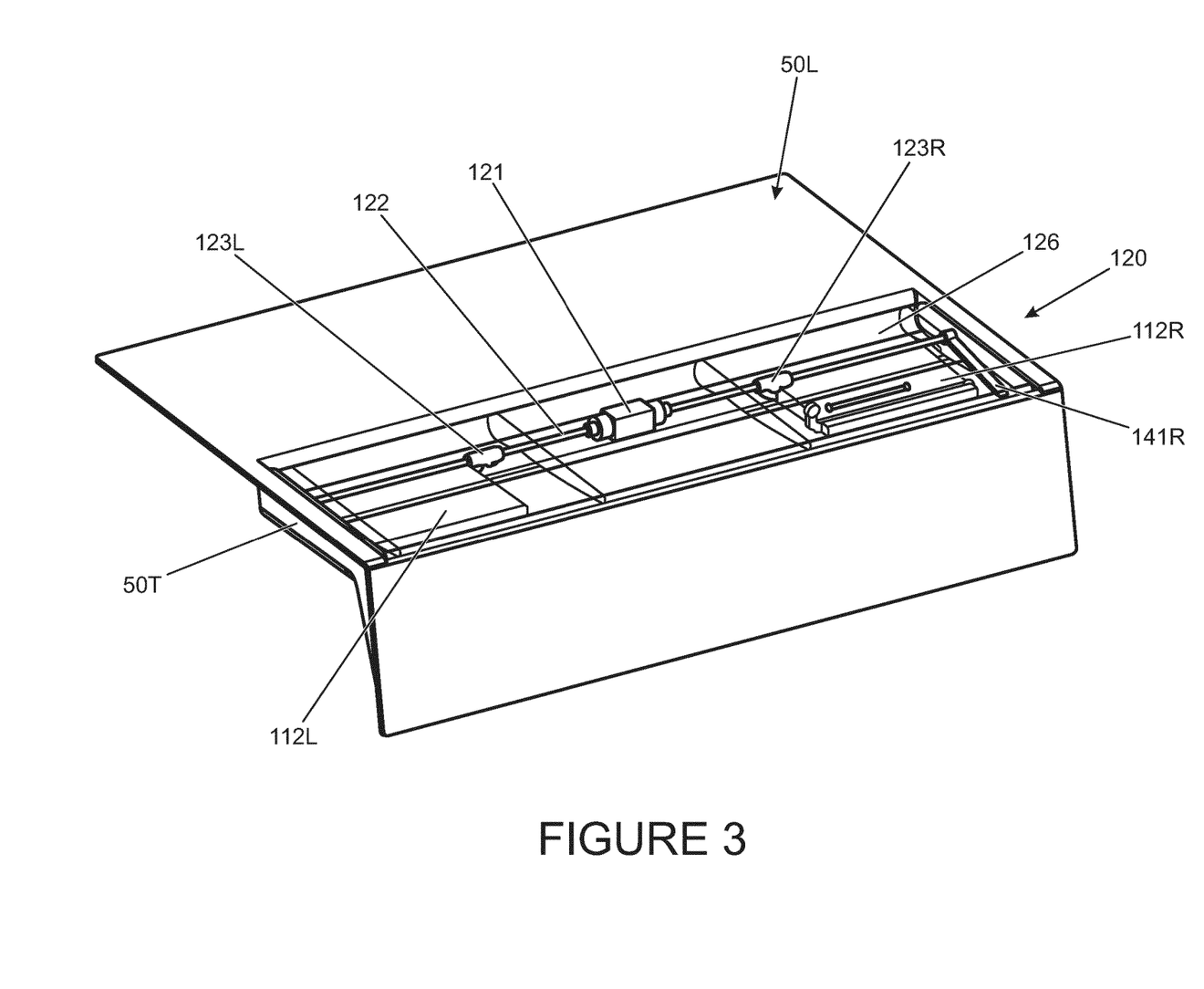
FIG. 3 is a rear perspective view of the rear wing apparatus of FIG. 1 in the retracted condition.

The pair of lever arms 112L, 112R are each pivotably coupled at a first end to the base portion 105B about respective axes parallel to a longitudinal (x) axis of the vehicle body 50B. The lever arms 112L, 112R are provided inboard of respective left and right opposite lateral ends of the base portion 105B and are each arranged to pivot between a retracted (or 'stowed') position in which they project inwardly towards a centreline of the vehicle body 50B, and a deployed position in which they are each substantially vertically oriented. FIG. 1 shows the apparatus 100 with the lever arms 112L, 112R in the deployed position, with the expandable wing assembly 120 raised to a deployed position. In the embodiment shown the lever arms 112L, 112R lie in a substantially horizontal plane when the apparatus 100 is in the retracted condition as shown in FIG. 3.

A second end of each lever arm 112L, 112R opposite the first is pivotably coupled to a respective threaded union joint 123L, 123R each of which sits within a primary wing portion 126 of the expandable wing assembly 120. The union joints 123L, 123R each have a threaded bore, the bores of the respective joints 123L, 123R being of opposite thread to one another. In the present embodiment the left-hand union joint 123L carries a left-hand thread and the right-hand union joint 123R carries a right-hand thread.

A pair of threaded bars 122L, 122R are also provided within the primary wing portion 126 and pass through the bores of respective union joints 123L, 123R. A first bar 122L that passes through the left-hand union joint 123L carries a left-hand thread corresponding to that of the left-hand union join 123L and a second bar 122R that passes through the right-hand union joint 123R carries a right-hand thread corresponding to that of the right-hand union join 123R.

The threaded bars 122L, 122R are coupled to a primary drive motor 121 that is substantially coaxial with the bars 122L, 122R. The bars 122L, 122R are coupled to respective left and right spindles of the motor 121 in the arrangement shown and the motor 121 is configured to cause rotation of the bars 122L, 122R relative to a casing 121C of the motor 121. The casing 121C is coupled to the primary wing portion 126 of the wing assembly 120. Accordingly, the motor 121 is able to cause turning of the threaded bar 122 relative to the primary wing portion 126 which in turn causes the union joints 123L, 123R to move either towards one another, i.e. in an inboard direction within the primary wing portion 126, or away from one another, i.e. in an outboard direction. It is to be understood that if in the position shown in FIG. 1 the motor 121 rotates in a direction to cause the union joints 123L, 123R to move in the inboard direction, the primary wing portion 126 will be lowered. Rotation of the motor 121 in the opposite direction causes the primary wing portion 126 to be raised.

The union joints 123L, 123R are each coupled to an inboard end of a respective secondary wing portion 127L, 127R. The secondary wing portions 127L, 127R are arranged concentrically with respect to the primary wing portion 126 and are configured to extend telescopically from the primary wing portion 126 when the union joints 123L, 123R are moved in an outboard direction. That is, when the union joints 123L, 123R are moved in an outboard direction from the position assumed when the apparatus 100 is in the retracted condition to the position assumed when the apparatus 100 is in the deployed condition (illustrated in FIG. 1 and FIG. 2), the secondary wing portions 127L, 127R move from respective retracted positions in which they sit substantially wholly within the primary wing portion 126 to extended (deployed) positions in which they project from the primary wing portion 126 in a laterally outboard direction, increasing the overall wing span of the wing assembly 120.

It is to be understood that one advantage of the embodiment of FIG. 1 is that the action of a single actuator, the primary drive motor 121, is able to cause both raising of the wing assembly 120 and extension of the wing assembly from a first wing span value (corresponding to the lateral length of the primary wing portion 126) to a second wing span value (corresponding to the lateral length of the primary wing portion 126 and extended portions of the secondary wing portions 127L, 127R). In the present embodiment, the first wing span value is substantially 1.25 m and the second wing span value is substantially 2 m. Other values may be useful in some embodiments, depending on the required performance characteristics and constraints imposed by available package space within the boot lid 50L.

The manner in which switching of the apparatus 100 between the retracted and deployed conditions is effected is described in more detail below.

In the present embodiment, an automatic shooting bolt arrangement is provided for locking the rear wing apparatus 100 to the vehicle body structure 50B when the apparatus 100 assumes the deployed condition. It is to be understood that the aerodynamic downforce generated by the wing assembly 120 may be substantial when the vehicle is travelling at speed. Accordingly, the boot lid 50L and components by means of which the lid 50L is attached to the vehicle body 50B may be subject to substantial downward force. The downward force can cause accelerated degradation of these components, which are required to perform important primary functions such as hinging of the boot lid (in the case of hinges) or secure closure of the boot lid 50L in the case of a lock. Accordingly, the present applicant has conceived the feature of anchoring or locking the rear wing apparatus 100 to the body 50B of the vehicle when the wing assembly 120 assumes the deployed condition so that forces on the wing assembly 120 are transmitted at least in part directly to the vehicle body 50B from the apparatus 100 and not entirely via hinges and/or a lock.

To this effect, the first end of each of the lever arms 112L, 112R carries a cam-like portion that is coupled to a first end of a respective bar linkage 112B that is in turn coupled at a second end to a respective shooting bolt 113L, 113R. As can be seen in FIG. 1, rotation of the lever arms 112L, 112R causes movement of first ends of the respective bar linkages 112B in an outboard direction when the lever arms 112L, 112R are raised, which in turn causes shooting bolts 113L, 113R to slide laterally outboard so that the bolts 113L, 113R project laterally outboard from the tray 50T of the boot lid 50L. With the boot lid 50L in the closed position as shown in FIG. 1, the shooting bolts 113L, 113R slide through respective apertures into recesses 50BR formed in the vehicle body 50B. Accordingly, as noted above, aerodynamic forces on the rear wing apparatus 100 in a downward, upward, forward or rear direction may be transferred substantially directly to the vehicle body structure 50B, rather than substantially entirely via the boot lid 50L. This feature has the effect of reducing adverse stress loading on hinges and a lock associated with the boot lid 50L, reducing a risk of premature wear and premature failure of one or more of these components. The feature may also increase a rigidity with which the apparatus 100 is supported on the vehicle, reducing relative movement between the apparatus 100 and vehicle body 50B. This may in turn enhance one or more handling characteristics of the vehicle.

It is to be understood that a further advantage of the embodiment of FIG. 1 is that the action of a single actuator, the primary drive motor 121, is able to cause raising of the wing assembly 120, extension of the wing assembly 120 from the first wing span value to the second wing span value and, in addition, actuation of the shooting bolts 113L, 113R to cause locking of the rear wing apparatus 100 to the vehicle body structure 50B, when the apparatus 100 assumes the deployed condition.

Figure 4:
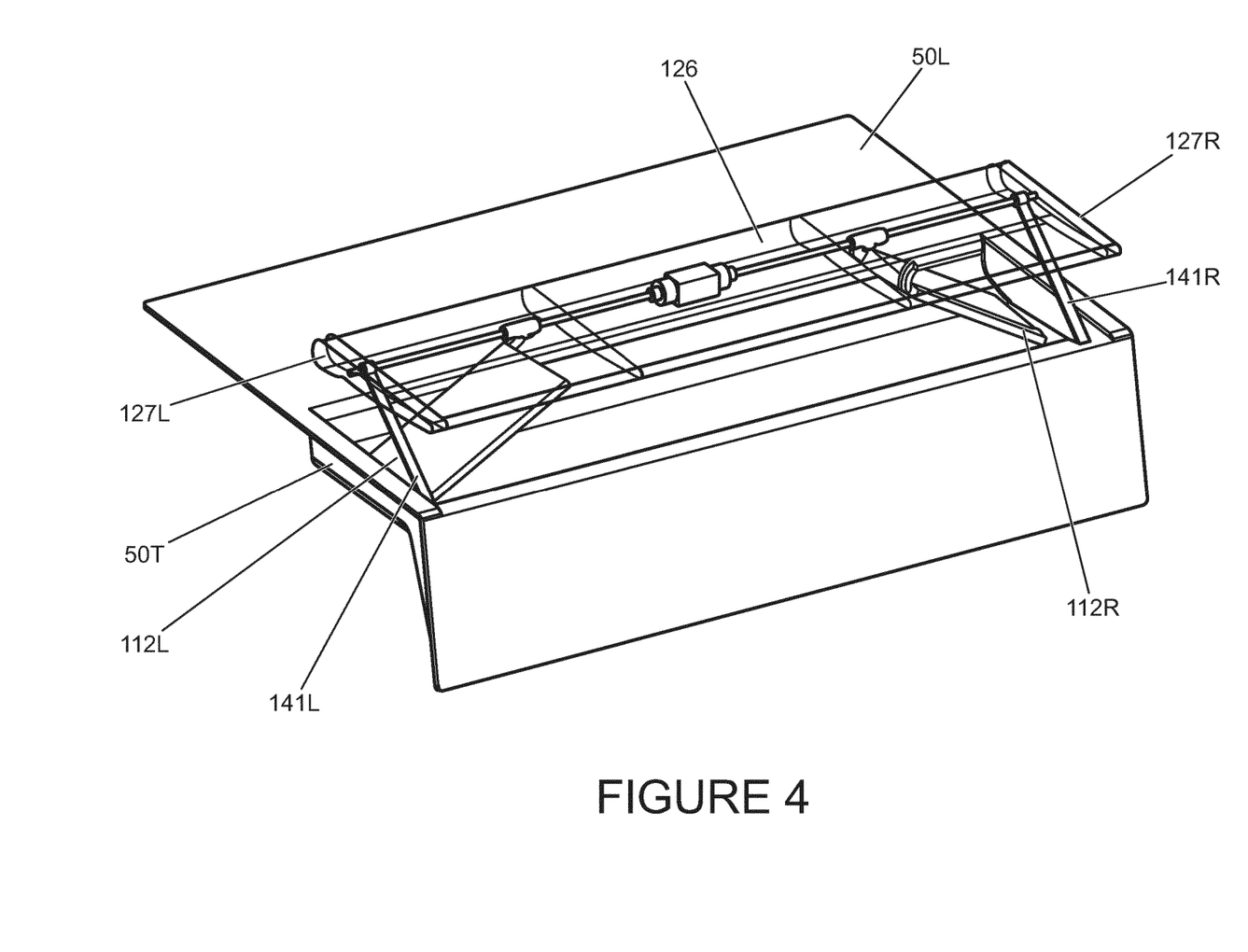
FIG. 4 is a rear perspective view of the rear wing apparatus of FIG. 1 mid-way between the retracted and deployed conditions.

FIG. 4 shows the rear wing apparatus 100 in a condition mid-way between the retracted and deployed conditions.

Figure 5:
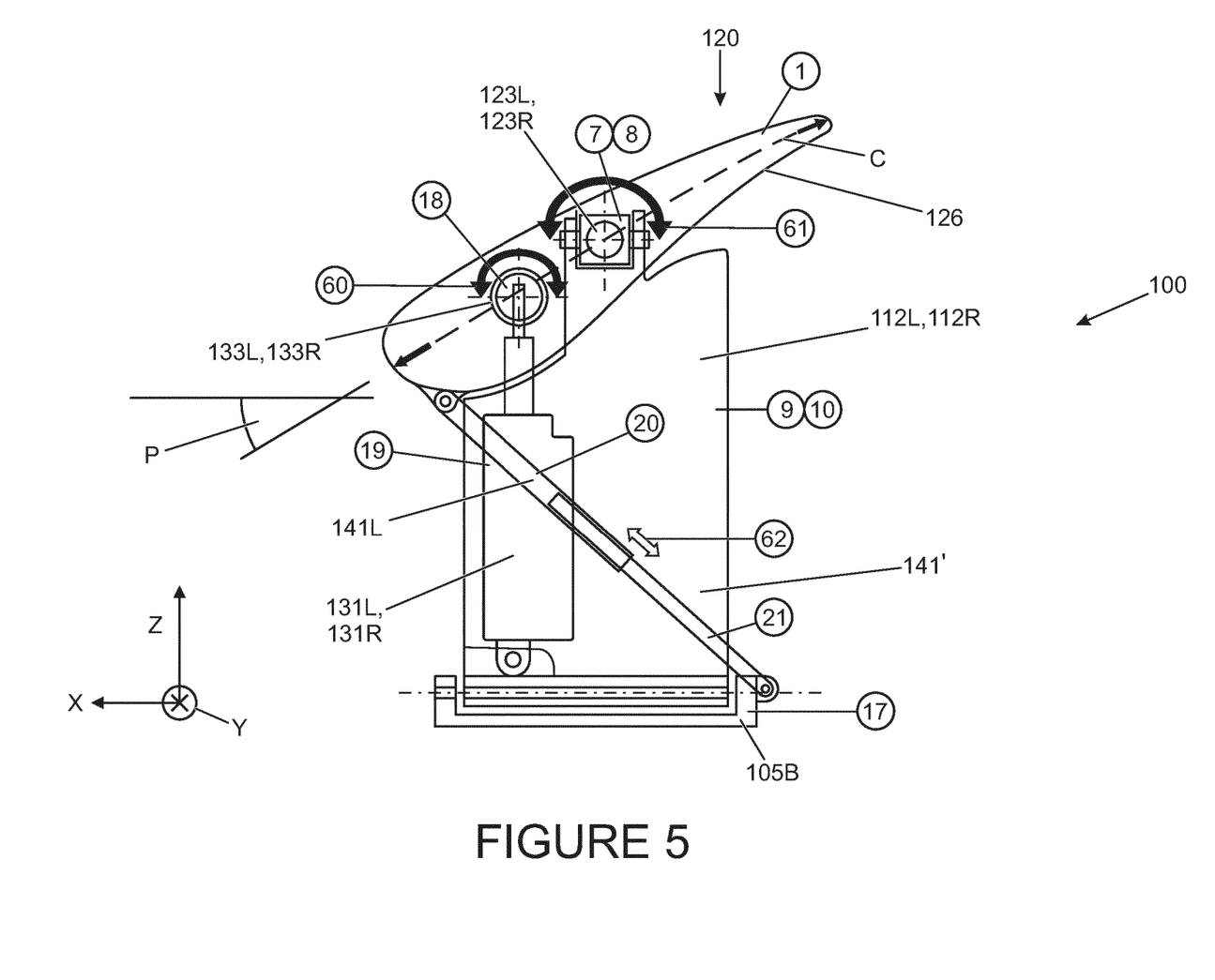
FIG. 5 is a sectional side view of the rear wing apparatus of FIG. 1.

FIG. 5 is a sectional side view of the rear wing apparatus of FIG. 1.

The apparatus 100 is also provided with a pair of vertical stabiliser devices 141L, 141R shown in FIG.'s 2, 3, 4 and 5 but omitted from FIG. 1 for clarity. The vertical stabiliser devices 141L, 141R are provided immediately adjacent and outboard of a respective lever arm 112L, 112R in order to increase a stiffness of the wing assembly 100 in use. The vertical stabiliser devices 141L, 141R are each in the form of a gas-filled damper that is able to increase in length as the apparatus 100 transitions from the retracted to the deployed conditions and decrease in length in a corresponding manner when the apparatus 100 transitions from the deployed to the retracted conditions. It is to be understood that in some embodiments one or both of the vertical stabiliser devices 141L, 141R may be omitted.

The rear wing apparatus 100 is also configured to allow a pitch angle of the wing assembly 120 to be adjusted whilst the wing assembly 120 is in the deployed position. FIG. 5 illustrates the means by which adjustment of the pitch angle is effected. For the purposes of the present discussion a pitch angle P of the wing assembly 120 will be considered to be the angle between a chord C of the primary wing portion 126 and a horizontal plane.

As shown in FIG. 5, a pitch actuator device 131 in the form of an extendable strut member 131 is located within each of the lever arms 112L, 112R, device 131L being provided within the left-hand lever arm 112L and device 131R being provided within the right-hand lever arm. The devices 131L, 131R are coupled at a first end to the primary wing portion 126 at a respective pitch angle articulation pivot 133L, 133R that is located forward of the respective union joints 123L, 123R. A second end opposite the first is coupled to a rearward edge of the base portion 105B of the apparatus 100.

It is to be understood that other locations of the pitch actuator devices 131L, 131R may be useful in some embodiments. In some embodiments only a single pitch actuator device is provided. In some embodiments one or more pitch actuator devices may be located externally of the lever arms 112L, 112R, instead of within a lever arm. In some embodiments the single pitch actuator is provided.

The pitch actuator devices 131L, 131R are arranged to freely pivot about the primary wing portion 126 at the respective pitch angle articulation pivot 133L, 133R. The primary wing portion 126 is also configured to pivot about the point at which the union joints 123L, 123R are coupled to the lever arms 112L, 112R. Thus, with the apparatus in the deployed position as shown in FIG. 5, adjustment of the length of the pitch actuator devices 131L, 131R allows the pitch angle P of the wing assembly 120 to be varied.

The pitch angle articulation pivots 133L, 133R are further configured to allow pivoting of the pitch actuator devices 131L, 131R about the respective pitch angle articulation pivot 133L, 133R to allow the pitch actuator devices 131L, 131R to fold towards the primary wing portion 126 when the wing apparatus 100 switches between the deployed and retracted conditions.

As noted above, the length of the pitch actuator devices 131L, 131R may be adjusted to vary the pitch angle P of the primary wing portion 126, with the wing assembly 120 assuming a steeper pitch-down condition (larger P) the shorter the length of the pitch actuator devices 131L, 131R.

Figure 6:
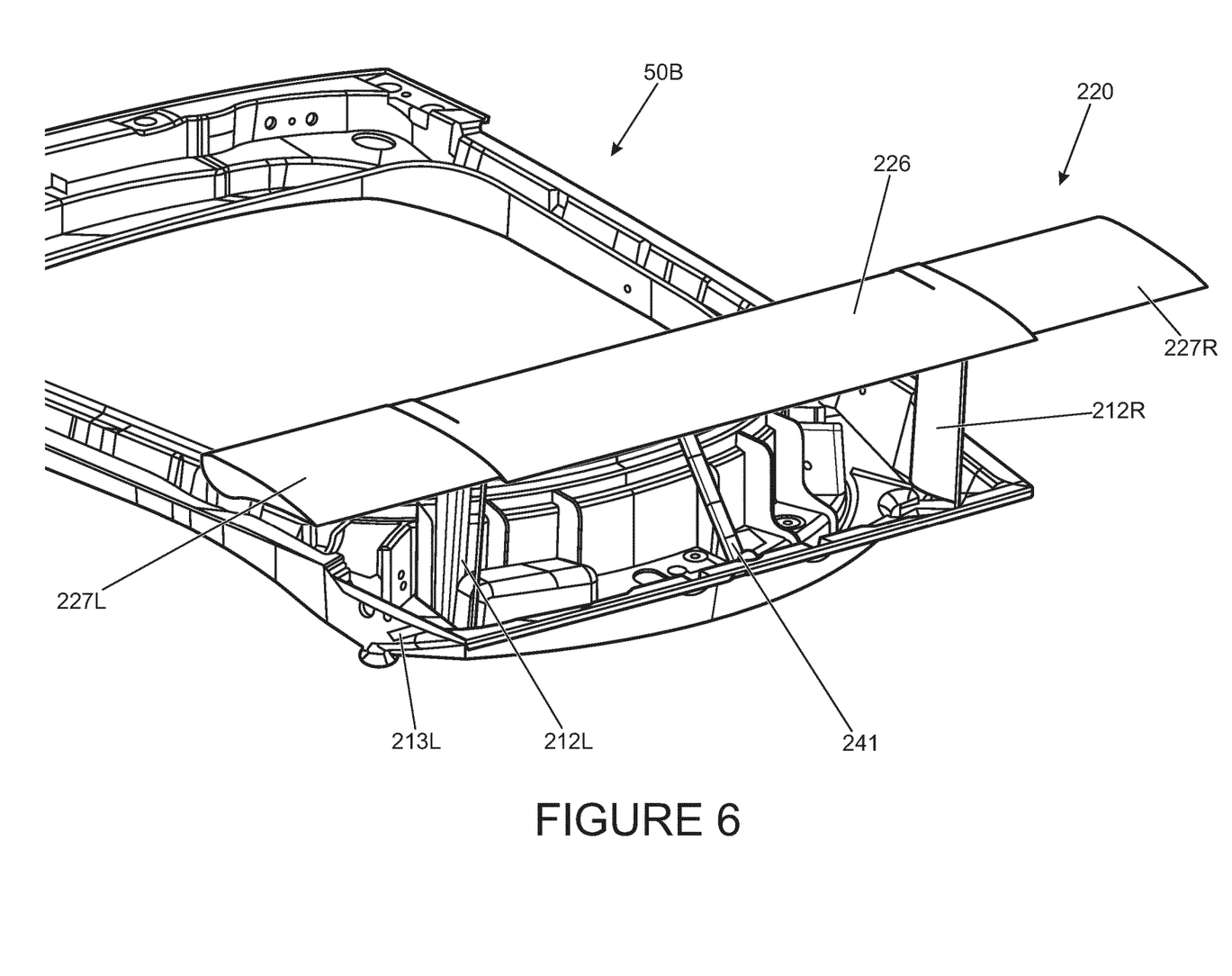
FIG. 6 is a rear perspective view of rear wing apparatus according to a further embodiment of the present invention in the deployed condition showing a pitch control device but with the boot lid not shown for clarity.
Figure 7:
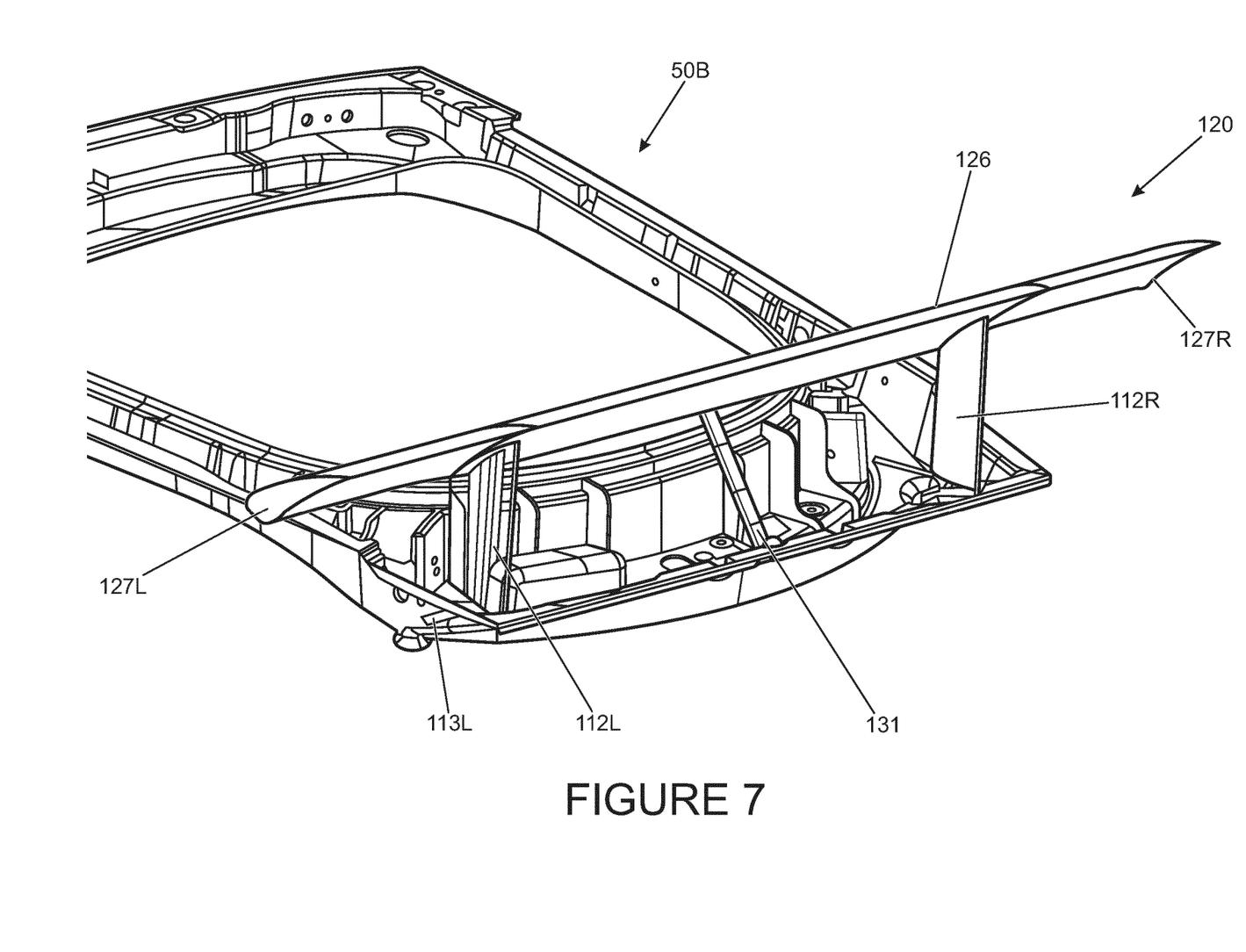
FIG. 7 is a rear perspective view of the rear wing apparatus of the embodiment of FIG. 6 but with the wing assembly in a steeper pitch-down condition relative to that shown in FIG. 6.

FIG. 6 and FIG. 7 show wing apparatus 200 according to a second embodiment of the invention. Like features of the embodiment of FIG. 6 and FIG. 7 to those of the embodiment of FIGS. 1 to 5 are shown with like reference numerals incremented by 100. The apparatus 200 is shown in FIG. 6 with the wing assembly 220 in a relatively shallow pitch-down condition, whilst FIG. 7 shows the apparatus 200 with the wing assembly 220 in a relatively steep pitch-down condition, the pitch angle being adjusted by means of pitch actuator devices (not shown) located within the lever arms 212L, 212R in a similar manner to the apparatus 100 of FIGS. 1 to 5.

A principle difference between the apparatus 100 of FIG. 1 and that of FIG. 6 is that in the apparatus of FIG. 6 a single stabiliser device 241 is provided, substantially at a lateral mid-point of the wing assembly 200. The choice of position of stabiliser for a given application of wing apparatus according to an embodiment of the present invention may be made within the constraints of available packaging space, aerodynamic constraints such as additional drag due to increased surface area, economic constraints and so forth.

Figure 8:
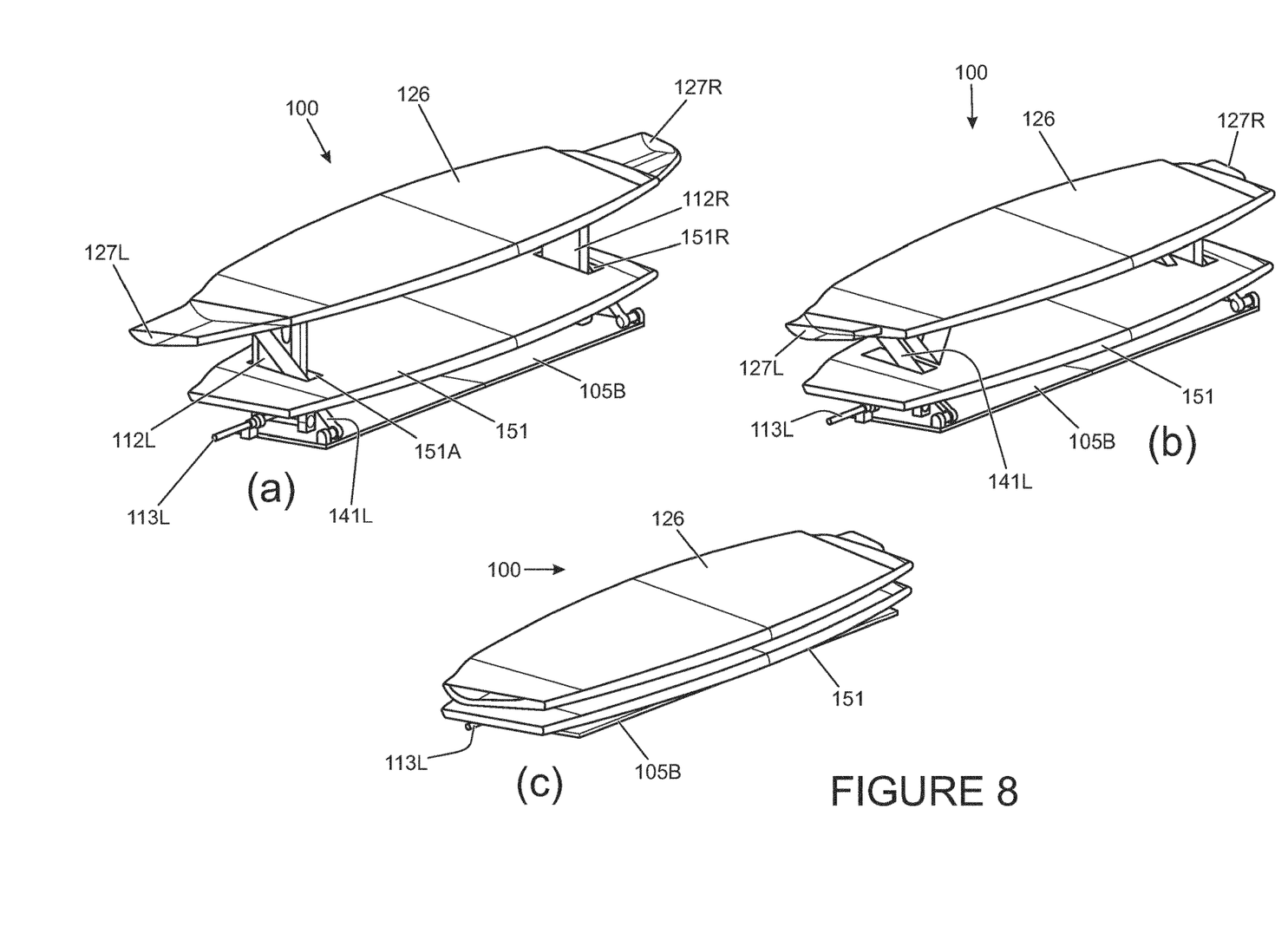
FIG. 8 is a rear perspective view of the rear wing apparatus of FIG. 1 in (a) a deployed condition, (b) a partially retracted condition and (c) a retracted condition.
Figure 9:
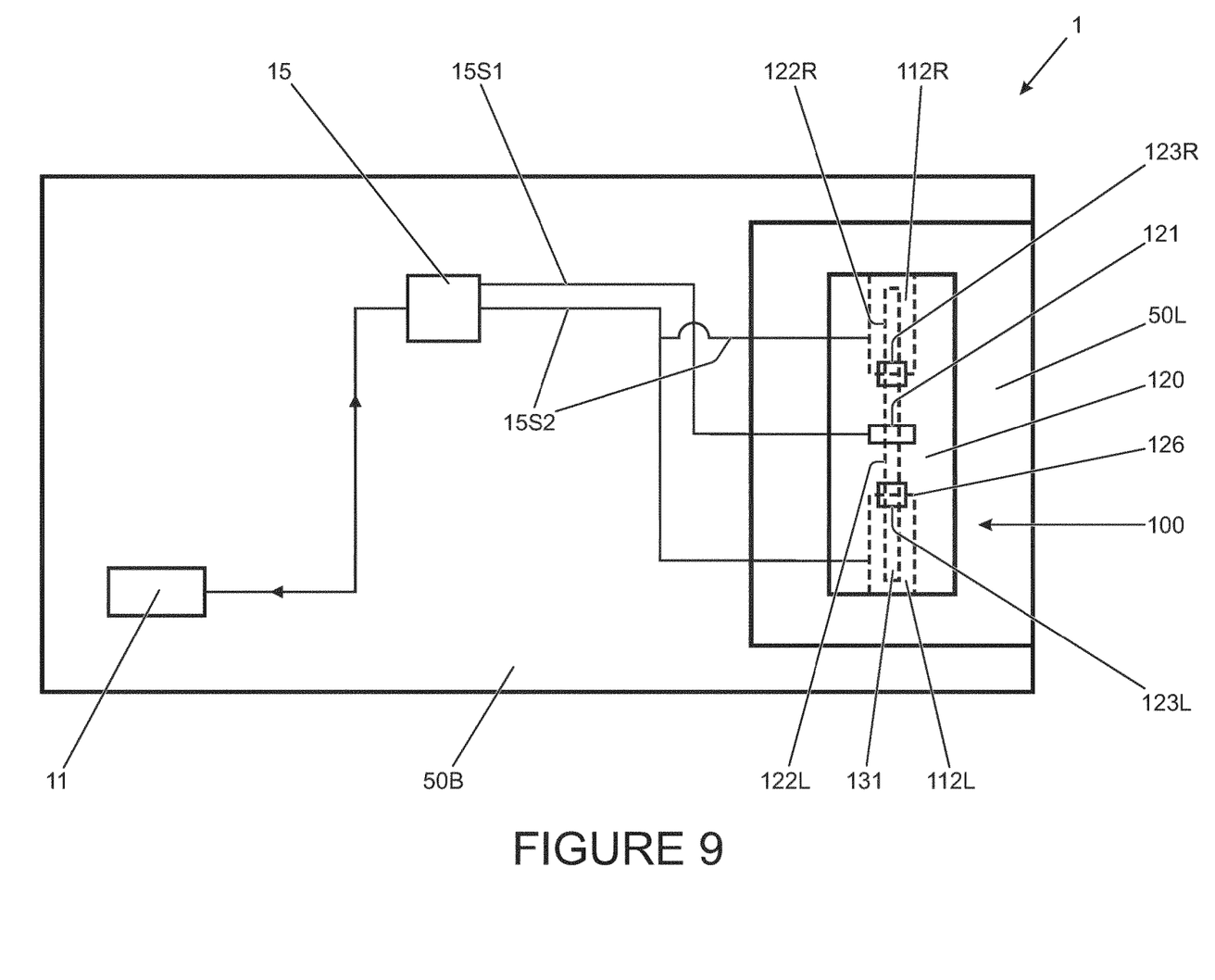
FIG. 9 is a plan view of a vehicle incorporating the rear wing apparatus of FIG. 1 in a boot lid thereof.

The embodiment of the rear wing apparatus 100 shown in FIGS. 1 to 5 is provided with a cover panel 151 (FIG. 1, FIG. 8) that covers the tray 50T in which the wing assembly 120 is stored when the assembly 120 is in the deployed condition shown in FIG. 8(a). The apparatus 100 is configured to cause the cover panel 151 to be lifted to cover the void created in the tray 50T when the wing assembly 120 is raised out from the tray 50T. The direction of movement of the cover panel 151 is indicated by arrows 151A in FIG. 1. The cover panel 151 is lifted from a lowered position as shown in FIG. 8(c) to a raised position shown in FIG. 8(a) to provide a visible ('A') surface of the apparatus 100 that is substantially flush with a remainder of the 'A' surface of boot lid 50L surrounding the region in which the apparatus 100 is provided. The cover panel 151 is provided at least in part in order to reduce the amount of aerodynamic drag associated with the vehicle when travelling at speed with the apparatus 100 in the deployed condition due to turbulent flow in the region of the tray 50T, below the wing assembly 120.

It is to be understood that the upper surface of the primary wing portion 126 provides an upper visible ('A') surface of the apparatus 100 when the apparatus 100 assumes the retracted condition instead of the cover panel 151, which assumes the lowered position.

FIG. 8(b) shows the apparatus 100 with the wing assembly 120 in an intermediate configuration between the deployed condition of FIG. 8(a) and the lowered (retracted or stowed) condition of FIG. 8(c).

In the present embodiment, the lever arms 112L, 112R protrude through apertures 151A formed in the cover panel 151 when the apparatus 100 is in the deployed condition. Each of the lever arms 112L, 112R carries a respective pin element 153L, 153R (FIG. 1) that locates within a corresponding lateral slot 152L, 152R formed in the cover panel 151. The pin elements 153L, 153R and slots 152L, 152R are arranged such that as the lever arms 112L, 112R swing from their positions when the apparatus 100 is in the retracted (or stowed) condition to their positions when the apparatus 100 is in the deployed condition, the pin elements 153L, 153R slide within the corresponding lateral slot 152L, 152R and cause lifting of the cover panel 151 from the lowered position to the raised position, substantially flush with the remainder of the boot lid 50L as noted above. It is to be understood that other arrangements may be useful in some embodiments.

The rear wing apparatus 100 is provided in the body 50B of a vehicle 1 in combination with a controller 15 as illustrated schematically in FIG. 8. FIG. 8 also shows the boot lid 50L (FIG. 1) to which the apparatus 100 is mounted.

The controller 15 is configured to cause the primary drive motor 121 of the apparatus 100 to be operated to cause the apparatus 100 to switch between the retracted and deployed conditions, via control line 15S1. The controller 15 is also configured to cause the pitch actuator device 131 to be operated to adjust the pitch angle of the wing assembly 126, via control line 15S2. It is to be understood that, because the apparatus 100 allows adjustment of the configuration of the wing assembly 126, such as a position or orientation of the wing assembly 126, to be made in real time under the control of the controller 15 (as opposed to by direct manual adjustment of the wing assembly 126) the apparatus 100 may be referred to as an active wing apparatus 100.

In the present embodiment, the controller 15 is configured to communicate with a brake controller 11 of the vehicle 1 in order to receive real-time signals indicative of the speed of the vehicle 1 over ground, the amount of brake pressure being applied in a hydraulic braking system of the vehicle 1 in order to cause braking, and the amount of lateral acceleration experienced by the vehicle 1, at a given moment in time.

The controller 15 determines whether the apparatus 100 should be placed in the retracted or deployed condition in dependence on the signal indicative of vehicle speed. If the vehicle speed exceeds a first deployment speed value for more than a predetermined time period, the controller 15 determines that the apparatus 100 should be caused to assume the deployed condition. The controller 15 the causes the apparatus 100 to assume the deployed condition by activating the primary drive motor 121. In the present embodiment the first deployment speed value is substantially 60 kph and the predetermined time period is substantially 5 s. Other speed values and other time periods may be useful in some embodiments.

If whilst the apparatus 100 is in the deployed condition the vehicle speed falls below a first retraction sped value for more than a predetermined time period, the controller 15 determines that the apparatus should be placed in the retracted condition. Accordingly, the controller 15 causes the apparatus 100 to assume the retracted condition by again activating the primary drive motor 121, but in the reverse direction. In the present embodiment the first retraction speed value is substantially 40 kph and the predetermined time period is substantially 5 s. Other speed values and other time periods may be useful in some embodiments.

When the controller 15 causes the apparatus 100 to assume the deployed condition, the controller 15 initially causes the wing assembly 120 to assume a baseline pitch angle P that is 10 degrees below a horizontal reference plane, the horizontal reference plane being a plane that is fixed with respect to the vehicle body 50B.

Whilst the apparatus 100 is in the deployed condition, the controller 15 monitors the signal indicative of brake pressure ('brake pressure signal') and the signal indicative of lateral acceleration ('lateral acceleration signal') in order to determine the required pitch angle P of the wing assembly 120.

In the present embodiment, the controller 15 causes the pitch angle P of the wing assembly 120 to be set to a predetermined value other than the baseline pitch angle in the event that the controller 15 determines that a predetermined force enhancement condition exists.

The controller determines that a predetermined force enhancement condition exists if any one of the following conditions is met:

(i) the lateral acceleration signal indicates that the amount of lateral acceleration experienced by the vehicle exceeds a first predetermined lateral acceleration value or has exceeded this period within a predetermined lateral acceleration period of the present time; or (ii) the brake pressure signal indicates that the amount of brake pressure exceeds a first predetermined brake pressure value or has exceeded this period within a predetermined brake pressure period of the present time.

In the event that only condition (i) is met, the controller 15 causes the pitch angle P of the wing assembly 120 to be set to a first predetermined cornering pitch angle, by causing actuation of the pitch actuator device 131.

In the event that only condition (ii) is met, the controller 15 causes the pitch angle P of the wing assembly 120 to be set to a first predetermined braking pitch angle.

In the event that both conditions (i) and (ii) are met, the controller 15 causes the pitch angle P of the wing assembly 120 to be set to the higher of the first predetermined cornering pitch angle and the first predetermined braking pitch angle. If one of the two conditions is subsequently not met but the other is, the controller 15 causes the pitch angle to be set to the value corresponding to the condition that is met, until the condition is no longer met. When neither condition is met the controller 15 causes the pitch angle P of the wing assembly 120 to revert to the baseline pitch angle.

In the present embodiment, the first predetermined cornering pitch angle is substantially 30 degrees below the horizontal plane, the first predetermined lateral acceleration value is 0.5 g and the predetermined brake pressure period is substantially 5 s. Other values of predetermined cornering pitch angle, predetermined lateral acceleration value and predetermined brake pressure period may be useful in some embodiments.

In the present embodiment the first predetermined braking pitch angle is substantially 30 degrees, the first predetermined brake pressure value is substantially 5 bar and the predetermined brake pressure period is 5 s. Other values of first predetermined braking pitch angle, predetermined brake pressure value and predetermined brake pressure period may be useful in some embodiments.

In some embodiments, in the event that both of conditions (i) and (ii) are met the controller 15 may cause the pitch angle P of the wing assembly 120 to be set to a predetermined value that is higher than both the first predetermined cornering pitch angle and the first predetermined braking pitch angle in order to further increase the downward force imposed on the vehicle 1 by the wing assembly 120 whilst the vehicle 1 is braking and cornering.

In some embodiments, the pitch angle P to which the wing assembly 120 is set during cornering may be dependent on the lateral acceleration value experienced by the vehicle 1, the amount by which the pitch angle is steepened below the baseline value increasing with increasing lateral acceleration as indicated by the lateral acceleration signal.

Similarly, in some embodiments, the pitch angle P to which the wing assembly 120 is set during braking may be dependent on the brake pressure value experienced by the vehicle 1, the amount by which the pitch angle is steepened below the baseline value increasing with increasing brake pressure value as indicated by the brake pressure signal.

In some embodiments, the wing apparatus 100 may be configured to assume the deployed condition when vehicle speed exceeds a predetermined value and, once deployed, remain deployed until the vehicle 1 remains stationary for more than a predetermined time period, or the vehicle is placed in a parked condition. The controller 15 may determine that the vehicle 1 is in a parked condition by one or more of a variety of means, for example by determining that a driver has placed a transmission of the vehicle in a 'park' or similar mode, where the transmission has such a mode, that the driver has switched off an engine of the vehicle, and/or any other suitable means.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An active wing apparatus for a motor vehicle, the apparatus comprising:
    a wing assembly configured to reversibly deploy in a first direction from a stowed condition to a deployed condition;
    at least one lifting arm configured to lift the wing assembly when the apparatus transitions from the stowed condition to the deployed condition; and
    an anchor coupled to the at least one lifting arm and configured to releasably couple the apparatus to a structural member of the motor vehicle;
    wherein movement of the at least one lifting arm to transition the apparatus from the stowed condition to the deployed condition causes the anchor to releasably couple the apparatus to the structural member of the motor vehicle;
    wherein the apparatus is configured to be attached to a boot lid of the motor vehicle, wherein the structural member is a portion of the motor vehicle body other than the boot lid, wherein the anchor is configured to lock the apparatus to the structural member when the apparatus deploys from the stowed condition to the deployed condition, and wherein forces imposed on the apparatus are transferred at least in part directly to the portion of the motor vehicle body to which the apparatus is locked by the anchor.

2. The apparatus according to claim 1, wherein the at least one lifting arm is configured to rotate from a first position to a second position when the wing assembly is lifted from the stowed condition to the deployed condition, the apparatus being arranged wherein rotation of the at least one lifting arm towards the deployed condition causes the anchor to couple the apparatus to the structural member of the motor vehicle.

3. The apparatus according to claim 1, wherein the anchor comprises at least one shooting bolt configured to assume a deployed position when the apparatus is in the deployed condition and a stowed position when the apparatus in the stowed condition, wherein with the apparatus in the deployed condition the at least one shooting bolt locks the apparatus to the structural member of the motor vehicle and with the apparatus in the stowed condition the apparatus is released from the structural member.

4. The apparatus according to claim 3, wherein the at least one lifting arm is configured to rotate from a first position to a second position when the wing assembly is lifted from the stowed condition to the deployed condition, the apparatus being arranged wherein rotation of the at least one lifting arm towards the deployed condition causes the anchor to couple the apparatus to the structural member of the motor vehicle, and wherein the at least one lifting arm is pivotably coupled at a first end to a base portion of the apparatus and at a second end to the wing assembly.

5. The apparatus according to claim 4, wherein the at least one shooting bolt is coupled to the at least one lifting arm, wherein movement of the at least one lifting arm as the apparatus transitions from the stowed condition to the deployed condition causes the at least one shooting bolt to move to the deployed condition.

6. The apparatus according to claim 5, wherein the at least one shooting bolt is coupled to the at least one lifting arm by a bar linkage to form a slider crank mechanism, wherein rotation of the at least one lifting arm causes movement of the bar linkage which in turn causes axial translation of the at least one shooting bolt from the stowed condition to the deployed condition.

7. The apparatus according to claim 5, wherein the at least one lifting arm comprises at least two lifting arms arranged to pivot about their first ends in opposite directions when the apparatus transitions from the stowed to the deployed conditions, each lifting arm being coupled to a respective one of the at least one shooting bolt.

8. A motor vehicle comprising the apparatus according to claim 1.

9. The motor vehicle according to claim 8, wherein the apparatus is coupled to a boot lid of the motor vehicle and the anchor is configured releasably to couple the apparatus to the structural member of the motor vehicle, wherein the structural member forms part of a body of the motor vehicle other than the boot lid.

10. The motor vehicle according to claim 9, wherein the structural member is a portion of the body of the vehicle that defines at least in part an aperture that is opened and closed by the boot lid, and with respect to which the boot lid moves when the boot lid is opened or closed.

11. A method of deploying a motor vehicle active wing apparatus, wherein the apparatus is attached to a boot lid of the motor vehicle, the method comprising causing at least one lifting arm to:
    reversibly deploy a wing assembly in a first direction from a stowed condition to a deployed condition; and
    releasably couple the apparatus to a body of the motor vehicle to which the boot lid is attached so as to cause aerodynamic forces on the apparatus in a downward, upward, forward and rear direction to be transferred substantially directly to the body.

* * * * *